US010320751B2

(12) United States Patent
Lee et al.

(10) Patent No.: US 10,320,751 B2
(45) Date of Patent: Jun. 11, 2019

(54) DNS SERVER SELECTIVE BLOCK AND DNS ADDRESS MODIFICATION METHOD USING PROXY

(71) Applicant: SOOSAN INT CO., LTD, Seoul (KR)

(72) Inventors: Yong Hwan Lee, Seoul (KR); Min Hyeok Park, Seoul (KR); Soo Ro Kim, Seoul (KR); Gyu Ri Kim, Seoul (KR); Jun Hyeok Yim, Seoul (KR); Kyoung Tae Kang, Seoul (KR)

(73) Assignee: Soosan Int Co., LTD, Seoul (KR)

( * ) Notice: Subject to any disclaimer, the term of this patent is extended or adjusted under 35 U.S.C. 154(b) by 302 days.

(21) Appl. No.: 15/308,033

(22) PCT Filed: Apr. 17, 2015

(86) PCT No.: PCT/KR2015/003863
§ 371 (c)(1),
(2) Date: Oct. 31, 2016

(87) PCT Pub. No.: WO2015/182873
PCT Pub. Date: Dec. 3, 2015

(65) Prior Publication Data
US 2017/0063792 A1    Mar. 2, 2017

(30) Foreign Application Priority Data
May 26, 2014   (KR) .................. 10-2014-0062900

(51) Int. Cl.
*H04L 29/06*   (2006.01)
*H04L 29/12*   (2006.01)

(52) U.S. Cl.
CPC ...... *H04L 63/0281* (2013.01); *H04L 61/1511* (2013.01); *H04L 61/6013* (2013.01); *H04L 63/1441* (2013.01)

(58) Field of Classification Search
None
See application file for complete search history.

(56) References Cited

U.S. PATENT DOCUMENTS

| 2012/0303808 A1* | 11/2012 | Xie | H04L 63/0236 709/225 |
|---|---|---|---|
| 2014/0282887 A1* | 9/2014 | Kaminsky | H04L 61/1511 726/4 |
| 2015/0134956 A1* | 5/2015 | Stachura | H04L 63/0807 713/168 |

FOREIGN PATENT DOCUMENTS

| KR | 10-2006-0007538 A | 1/2006 |
|---|---|---|
| KR | 10-0732689 B1 | 6/2007 |

(Continued)

OTHER PUBLICATIONS

International Search Report dated Jul. 9, 2015 from corresponding International Application No. PCT/KR2015/003863.

(Continued)

*Primary Examiner* — Joseph P Hirl
*Assistant Examiner* — Hassan Saadoun
(74) *Attorney, Agent, or Firm* — Sandberg Phoenix & von Gontard, P.C.

(57) ABSTRACT

A network security system according to an embodiment may include: a DNS blocking server that is connected to network equipment to which a client terminal is connected and mirrors a DNS query packet going through the network equipment, and that generates and transmits a fake DNS response packet to the client terminal if a DNS query domain address of the DNS query packet is a domain address to be managed; and a proxy server that monitors a request packet from the client terminal generated using the fake DNS response packet.

14 Claims, 7 Drawing Sheets

(56) References Cited

FOREIGN PATENT DOCUMENTS

KR 10-2011-0124833 A 11/2011
KR 10-2014-0044987 A 4/2014

OTHER PUBLICATIONS

Written Opinion dated Jul. 9, 2015 from corresponding International Application No. PCT/KR2015/003863.

* cited by examiner

| DNS server address | Information |
|---|---|
| 10.10.0.2 | |
| 10.10.x.y | |
| 10.10.x.z | |

650

DNS SERVER SELECTIVE BLOCK AND DNS ADDRESS MODIFICATION METHOD USING PROXY

CROSS-REFERENCE TO RELATED APPLICATIONS

This application is the US National Stage of International Application PCT/KR2015/003863 which was filed Apr. 17, 2015, and published as WO2015182873, which derives priority from Korean App. No. 10-2014-0062990 filed May 26, 2014 and which are hereby incorporated by reference.

TECHNICAL FIELD

Embodiments of the present invention relate to technology that prevents information leakage, and more particularly, to a network security method.

BACKGROUND

With the development of information communications, information may be exchanged anytime and anywhere through Internet connection. However, there are a number of harmful websites providing unsound information. As a risk of information leakage and hacking increases, an interest in network security is increasing.

Korean Patent Application Publication No. 2014-0044987 discloses a system and method for guiding bypass of Internet connection path using domain name system (DNS) packet modulation that may enable smooth communication by preventing an Internet Protocol (IP) address collision. However, a network security system using a proxy server of the above patent application only examines and blocks an incoming packet, but does not block an outgoing packet. Accordingly, technology for providing a security service while maintaining an existing network environment is needed.

SUMMARY

Technical Goals

An aspect of the present invention provides a network security system that may provide a method of preventing information leakage using a proxy server.

Another aspect of the present invention provides a network security system that may provide a method of selectively blocking a domain name system (DNS) server.

Technical Solutions

According to an aspect of the present invention, there is provided a network security system including a domain name system (DNS) blocking server connected to network equipment to which a client terminal is connected, and configured to mirror a DNS query packet passing through the network equipment, and generate and transmit a fake DNS response packet to the client terminal when a DNS query domain address of the DNS query packet is a management target domain address, and a proxy server configured to monitor a request packet from the client terminal, the request packet generated using the fake DNS response packet.

The DNS blocking server may be configured to generate the fake DNS response packet by inputting an Internet Protocol (IP) address of the proxy server as a response IP address corresponding to the DNS query domain address.

The DNS blocking server may contain a management target domain address list including at least one management target domain address, and the DNS blocking server may be configured to extract the DNS query domain address from the DNS query packet, and determine whether the DNS query domain address is the management target domain address based on whether the DNS query domain address is included in the management target domain address list.

The management target domain address list may include an address of at least one webmail site, and the proxy server may be configured to notify a predetermined manager when the request packet from the client terminal is directed to the at least one webmail site, allow outgoing mail transmission through the webmail site when an approval request of the manager is received, and disallow the outgoing mail transmission through the webmail site when the approval request of the manager is absent.

The DNS blocking server may be configured to extract a DNS server address from the DNS query packet, and generate and transmit the fake DNS response packet to the client terminal by inputting an IP address of a warning server as a response IP address corresponding to the DNS query domain address of the DNS query packet when the DNS server address is a blocking target DNS server address.

The warning server may be configured to provide the client terminal with a webpage that displays a warning page to warn that the client terminal is using an unauthorized DNS server, along with an IP address of an authorized DNS server.

According to another aspect of the present invention, there is also provided a network security method including mirroring a DNS query packet passing through network equipment to which a client terminal is connected, extracting a DNS query domain address from the DNS query packet, determining whether the DNS query domain address is a management target domain address, generating a fake DNS response packet when the DNS query domain address is the management target domain address, and transmitting the generated fake DNS response packet to the client terminal.

The generating may include generating the fake DNS response packet by inputting an IP address of a proxy server as a response IP address corresponding to the DNS query domain address.

According to still another aspect of the present invention, there is also provided a network security method including mirroring a DNS query packet passing through network equipment to which a client terminal is connected, extracting a DNS server address from the DNS query packet, determining whether the DNS server address is a blocking target DNS server address, generating a fake DNS response packet when the DNS server address is the blocking target DNS server address, and transmitting the generated fake DNS response packet to the client terminal.

The generating may include generating the fake DNS response packet by inputting an IP address of a warning server as a response IP address corresponding to a DNS query domain address of the DNS query packet.

Effects

According to an embodiment, a network security system may perform filtering with respect to incoming and outgoing packets without setting an environment of a client terminal, thereby selectively allowing an access to a website and preventing information leakage.

According to an embodiment, a network security system may provide an Internet Protocol (IP) address of another server in response to a domain name system (DNS) query with respect to an unauthorized server when a DNS server request is received, thereby selectively blocking a website.

DETAILED DESCRIPTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
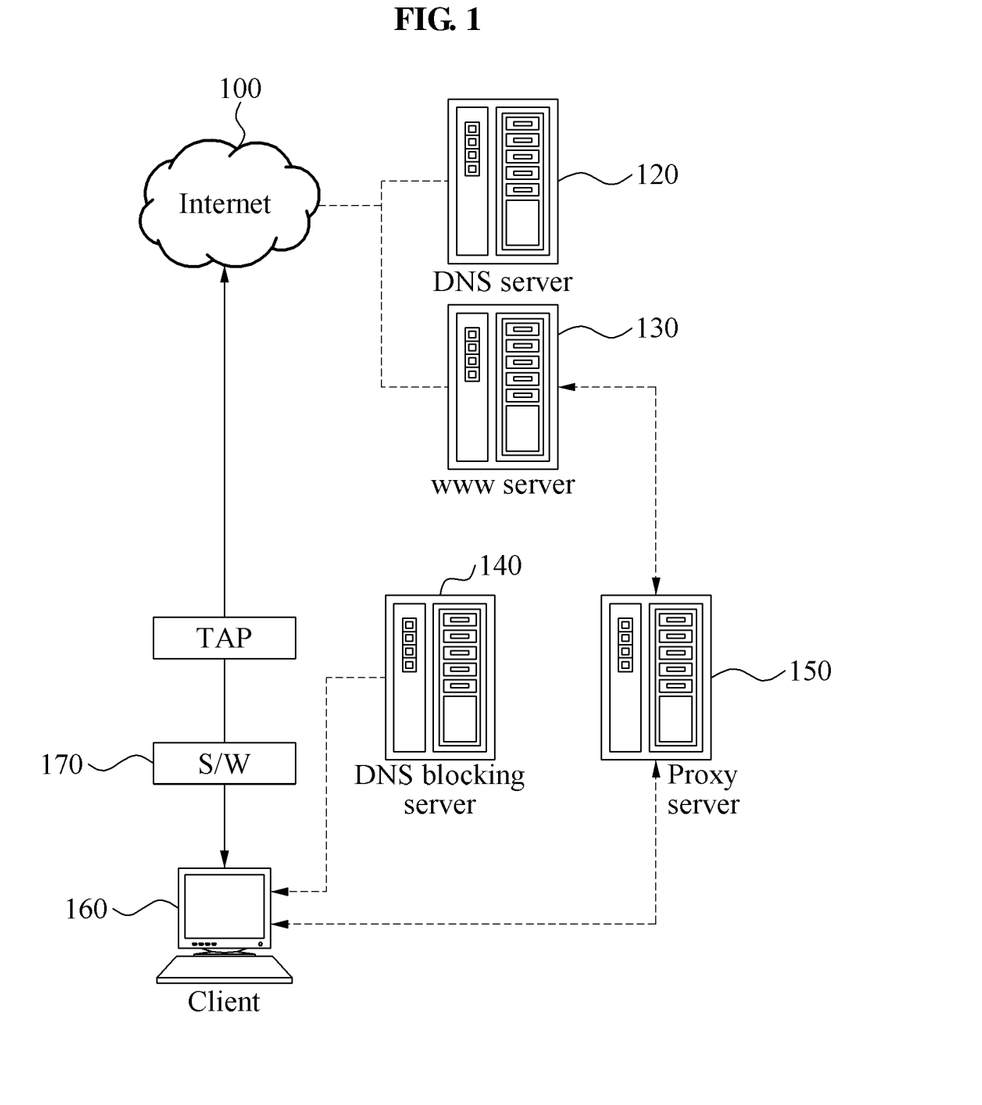
FIG. 1 illustrates an operation of a network security system according to an embodiment.

FIG. 1 illustrates an operation of a network security system according to an embodiment.

FIG. 1 illustrates an operation of preventing information leakage through a proxy server by changing a domain name system (DNS) response address. When accessing the Internet 100 using a client terminal 160 in a network environment, the client terminal 160 may be connected to a switch 170 or router. The client terminal 160 may be connected to the switch 170 or router, thereby performing network connection and data transmission. In this example, at least one client terminal 160 may access the Internet 100. For example, the client terminal 160 may be a personal computer (PC) or a smart phone.

A DNS blocking server 140 may be connected to network equipment to which the client terminal 160 is connected, and mirror a DNS query packet passing through the network equipment. The DNS blocking server 140 may store a list of management target domain addresses. For example, the DNS blocking server 140 may store management target domain addresses such as www.aaa.com, www.bbb.com, and www.ccc.com.

The DNS query packet may be transferred to an external DNS server 120 through the Internet 100, and also be transferred to the DNS blocking server 140 through mirroring. The DNS blocking server 140 may extract a DNS query domain address included in the DNS query packet. For example, the DNS blocking server 140 may extract a DNS query domain address www.abc.com included in the DNS query packet. In this example, the DNS blocking server 140 may determine whether the DNS query domain address is a management target domain address. The DNS blocking server 140 may determine whether the DNS query domain address is the management target domain address by comparing the DNS query domain address with the list of management target domain addresses stored in the DNS blocking server 140.

When the DNS query domain address is not the management target domain address, a www server 130 may transfer, to the client terminal 160, a DNS response packet with respect to the DNS query packet transferred to the external DNS server 120 through the Internet 100. The client terminal 160 may normally access a destination site using the DNS response packet and perform communication. The DNS response packet may be provided in response to a DNS query packet requesting an Internet Protocol (IP) address corresponding to a domain name, and may include the IP address corresponding to the domain name.

When the DNS query domain address of the DNS query packet is the management target domain address, the DNS blocking server 140 may generate and transmit a fake DNS response packet to the client terminal 160. The DNS blocking server 140 may generate the fake DNS response packet by inputting an IP address of a proxy server 150 as a response IP address corresponding to the DNS query domain address. The DNS blocking server 140 may transmit the generated fake DNS response packet to the client terminal 160. For example, when the DNS query domain address is www.abc.com is the management target domain address, the DNS blocking server 140 may generate a fake DNS response packet by inputting an IP address (for example, 10.10.10.10) of the proxy server 150 as a response IP address corresponding to the DNS query domain address, and transmit the generated fake DNS response packet to the client terminal 160.

The client terminal 160 may receive the fake DNS response packet and access the proxy server 150. The proxy server 150 may monitor a request packet from the client terminal 160, the request packet generated using the fake DNS response packet. When an access request is received from the client terminal 160, the proxy server 150 may identify a destination server from the access request, and receive a requested page from the destination server. The proxy server 150 may log and monitor a request directed to the destination server and communication received from the destination server, and may block the same in accordance with policy.

The management target domain address list may include an address of at least one webmail site. When the request packet from the client terminal 160 is directed to the at least one webmail site, the proxy server 150 may notify a predetermined manager, allow outgoing mail transmission through the webmail site when an approval request of the manager is received, and disallow the outgoing mail transmission through the webmail site when the approval request of the manager is absent.

For example, when sending mails using a webmail, a spam mail may be detected, and the detection may be notified to a boss of an employee who tried to send the corresponding mail. Only when an approval is received from the boss, the outgoing mail transmission may be allowed. It may be assumed that a user A sends a mail to a user B. In response to a DNS request with respect to mail.abc.com, the address 10.10.10.10 of the proxy server 150 may be allocated rather than an actual server address 125.209.222.15 of mail.abc.com. The client terminal 160 may try to access mail.abc.com. However, in reality, the client terminal 160 may access the proxy server 150 and be controlled by the proxy server 150. Further, not only an outgoing packet but also an incoming packet received as a reply to a request may be examined.

The network security system according to an embodiment may allow an access to a website through filtering with respect to an outgoing packet without setting an environment of a client terminal. Further, the network security system may perform the filtering after receiving all contents transmitted by the client terminal through a proxy server.

In an existing method, when a network security system does not work, normal network access may not be available in many cases. However, the network security system according to an embodiment may continuously perform network communication although a DNS blocking server or a proxy server does not work, and thus a service may not be discontinued. For example, although the DNS blocking server does not work, a DNS response packet may be transferred from a normal DNS server to a client terminal through mirroring, and thus the client terminal may perform normal network access using a DNS response packet. Further, while maintaining an existing network environment, a network security service in which a DNS blocking server and a proxy server are additionally installed may be provided, and thus installation, maintenance, and management thereof may be easy.

Figure 2:
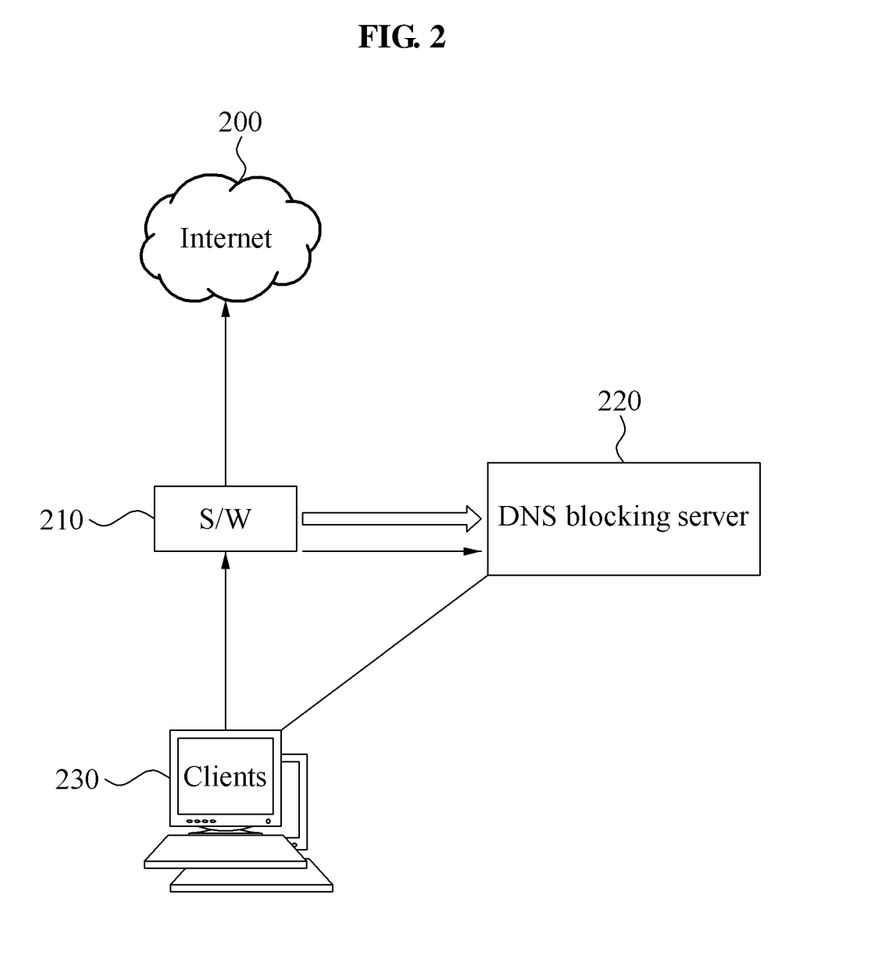
FIG. 2 illustrates an operation of a network security system according to an embodiment.

FIG. 2 illustrates an operation of a network security system according to an embodiment.

FIG. 2 illustrates an operation of selectively blocking a DNS server. Similar to the description provided with reference to FIG. 1, when accessing the Internet 200 using a client terminal 230 in a network environment, the client terminal 230 may be connected to a switch 210 or router. The client terminal 230 may be connected to the switch 210 or router, thereby performing network connection and data transmission. In this example, at least one client terminal 230 may access the Internet 200. For example, the client terminal 230 may be a PC or a smart phone.

A DNS blocking server 220 may mirror a DNS query packet passing through network equipment to which the client terminal 230 is connected. The DNS query packet may be transferred to an external DNS server through the Internet 200, and also be transferred to the DNS blocking server 220 through mirroring. In this example, the DNS blocking server 220 may store a list of blocking target DNS server addresses. For example, the DNS blocking server 220 may store blocking target DNS server addresses 100.100.100.101 and 111.111.111.111.

The DNS blocking server 220 may extract a DNS server address from the DNS query packet. For example, the DNS server address extracted from the DNS query packet may be 101.101.101.101. The DNS blocking server 220 may determine whether the DNS server address is a blocking target DNS server address. The DNS blocking server 220 may determine whether the DNS server address is the blocking target DNS server address by comparing the DNS server address with the list of blocking target DNS server addresses stored in the DNS blocking server 220.

When the DNS server address is not the blocking target DNS server address, a DNS response packet with respect to a DNS request packet transferred to the external DNS server through the Internet 200 may be transferred to the client terminal 230. The client terminal 230 may normally access a destination site using the DNS response packet and perform communication. When the DNS server address is the blocking target DNS server address, a webpage that displays a warning page to warn that the client terminal 230 is using an unauthorized DNS server may be transferred to the client terminal 230.

When the DNS server address extracted from the DNS query packet is 101.101.101.101, the client terminal 230 may access the destination site using the DNS response packet and perform communication since the extracted DNS server address is not a DNS server address stored in the blocking target DNS server address list. When the DNS server address extracted from the DNS query packet is 111.111.111.111, the DNS blocking server 220 may generate and transmit a fake DNS response packet to the client terminal 230 by inputting an IP address of a warning server as a response IP address corresponding to a DNS query domain address of the DNS query packet since the extracted DNS server address matches a DNS server address stored in the blocking target DNS server address list. In this example, the warning server may provide the client terminal 230 with the webpage that displays the warning page to warn that the client terminal 230 is using the unauthorized DNS server, along with an IP address of an authorized DNS server. In this example, the webpage may display the IP address of the authorized DNS server, thereby enabling the client terminal 230 to use the IP address of the authorized DNS server.

Figure 3:
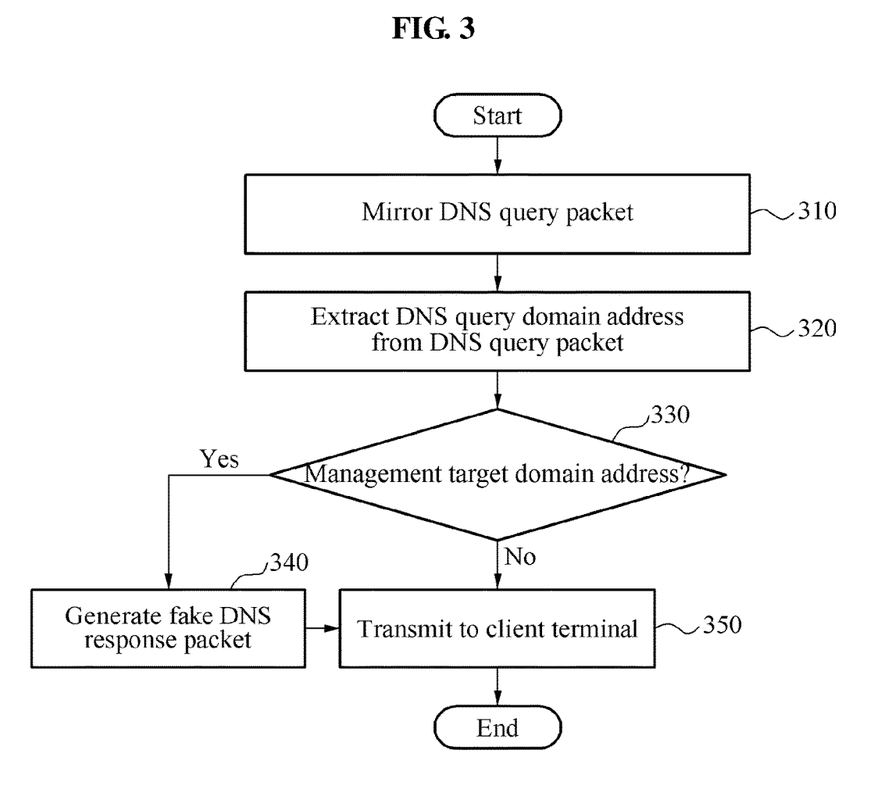
FIG. 3 is a flowchart illustrating a network security method of a network security system according to an embodiment.

FIG. 3 is a flowchart illustrating a network security method of a network security system according to an embodiment.

In operation 310, the network security system may mirror a DNS query packet passing through network equipment to which a client terminal is connected.

In operation 320, the network security system may extract a DNS query domain address from the DNS query packet. For example, a DNS query domain address www.ccc.com may be extracted from the DNS query packet.

Figure 6A:
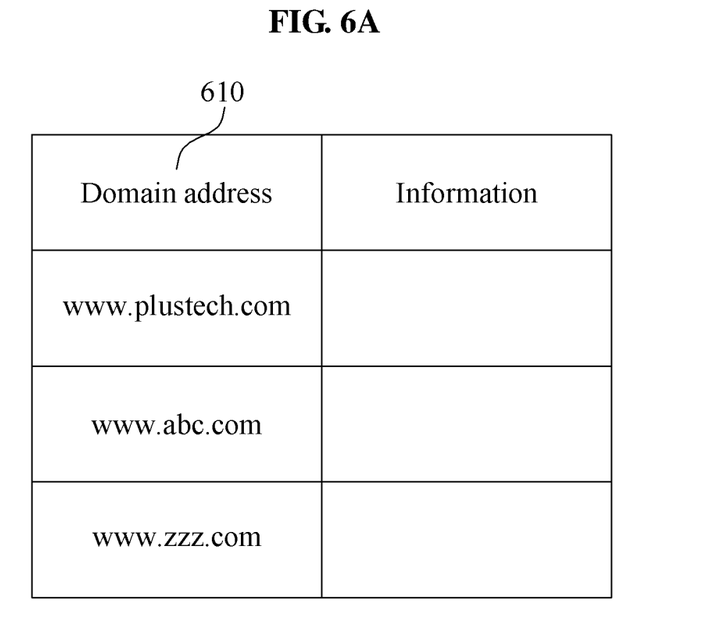
FIGS. 6A and 6B illustrate examples of lists of domain name system (DNS) blocking servers according to an embodiment.

In operation 330, the network security system may determine whether the DNS query domain address is a management target domain address. When the DNS query domain address is not the management target domain address, the network security system may transmit a DNS response packet with respect to the DNS query packet to the client terminal in operation 350. The client terminal may normally access a destination site using the DNS response packet and perform communication. For example, referring to FIG. 6A showing management target domain addresses, when a domain address extracted from the DNS query packet is www.plus.com, the network security system may transmit a DNS response packet with respect to the DNS query packet to the client terminal since the extracted domain address is not a management target domain address, and the client terminal may normally access www.plus.com.

When the DNS query domain address is the management target domain address, the network security system may generate a fake DNS response packet in operation 340, and transmit the generated fake DNS response packet to the client terminal in operation 350. The fake DNS response packet may be generated by inputting an IP address of a proxy server as a response IP address corresponding to the DNS query domain address. For example, referring to FIG. 6, when the domain address extracted from the DNS query packet is www.plustech.com, the network security system may generate the fake DNS response packet and transmit the generated fake DNS response packet to the client terminal since www.plustech.com is a management target domain address. When the IP address of the proxy server is, for example, 10.10.10.10, the network security system may transmit a fake DNS response packet to the client terminal by inputting the IP address of the proxy server as a response IP address corresponding to www.plustech.com.

Figure 4:
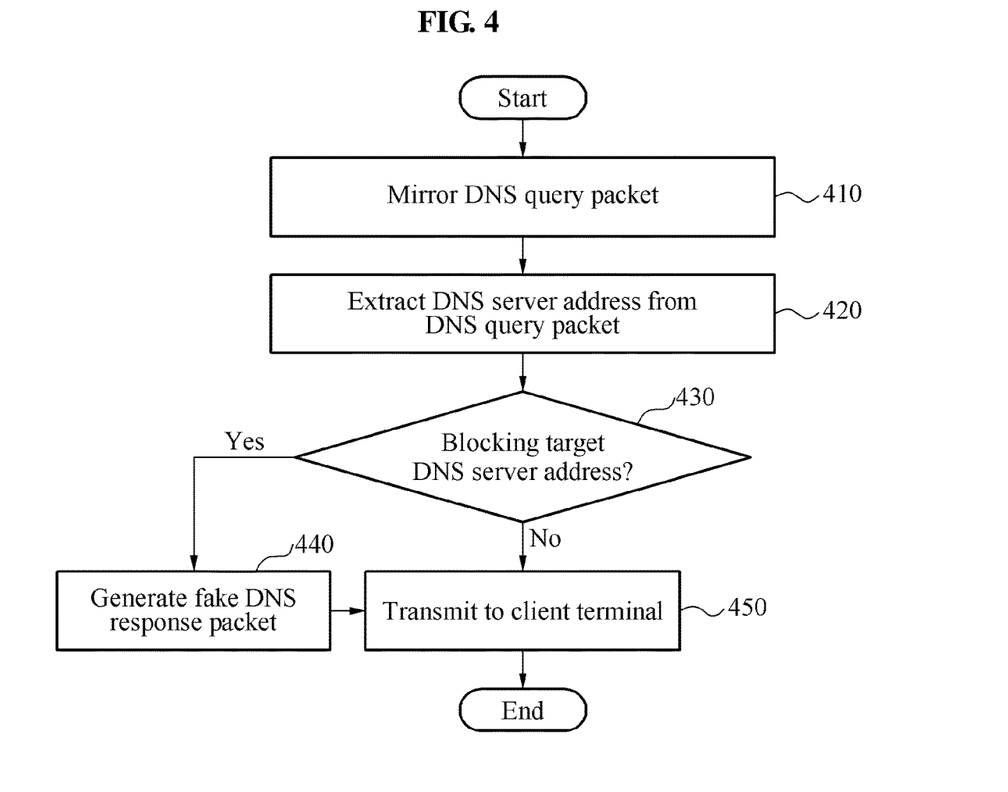
FIG. 4 is a flowchart illustrating a network security method of a network security system according to an embodiment.

FIG. 4 is a flowchart illustrating a network security method of a network security system according to an embodiment.

The network security method may be performed by the network security system.

In operation 410, the network security system may mirror a DNS query packet.

In operation 420, the network security system may extract a DNS server address from the DNS query packet. For example, a DNS server address 222.222.222.222 may be extracted from the DNS query packet.

In operation 430, the network security system may determine whether the DNS server address is a blocking target DNS server address. When the DNS server address is not the blocking target DNS server address, the network security system may transmit a DNS response packet with respect to the DNS query packet to a client terminal in operation 450. A DNS response packet with respect to a DNS request packet transferred to an external DNS server through the Internet may be transferred to the client terminal, and the client terminal may normally access a destination site using the DNS response packet and perform communication. For example, referring to FIG. 6B, when the DNS server address is 222.222.222.222, the network security system may transmit a DNS response packet with respect to the DNS query packet to the client terminal since the DNS server address is not a blocking target DNS server address, and the client terminal may access a destination site (for example, www.mmm.com) using the DNS server address 222.222.222.222, and perform communication.

When the DNS server address is the blocking target DNS server address, the network security system may generate a fake DNS response packet in operation 440, and transmit the generated fake DNS response packet to the client terminal in operation 450. The fake DNS response packet may be generated by inputting an IP address of a warning server as a response IP address corresponding to the DNS query domain address of the DNS query packet. For example, referring to FIG. 6B, when the DNS server address is 10.10.0.2, the network security system may generate and transmit a fake DNS response packet to the client terminal by inputting an IP address (for example, 333.333.333.333) of the warning server as the response IP address corresponding to the DNS query domain address (for example, www.mmm.com) of the DNS query packet since the DNS server address is a blocking target DNS server address. When the client terminal accesses www.mmm.com, a webpage that displays a warning page to warn that the client terminal is using an unauthorized DNS server may be displayed. By displaying an IP address of an authorized DNS server to the client terminal, the network security system may enable the client terminal to use the IP address of the authorized DNS server.

Figure 5:
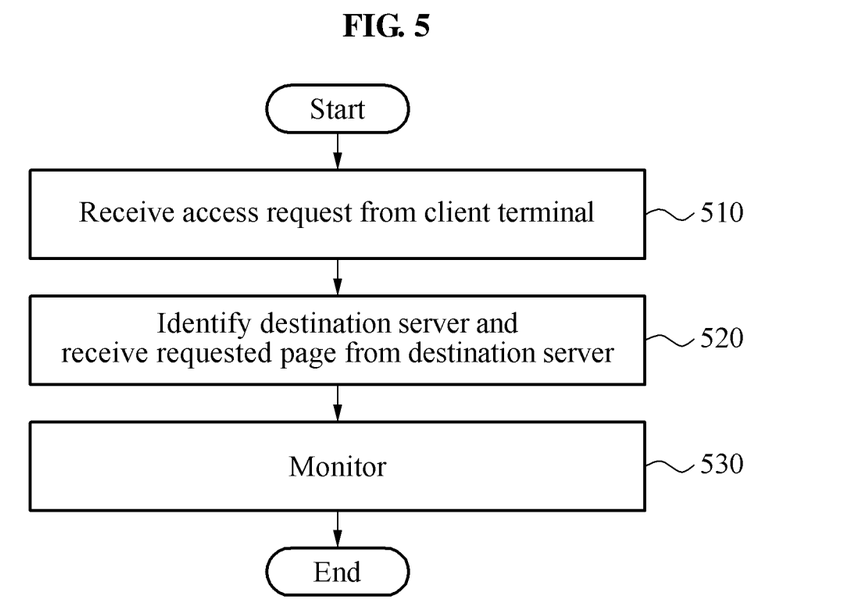
FIG. 5 is a flowchart illustrating an operating method of a proxy server according to an embodiment.

FIG. 5 is a flowchart illustrating an operating method of a proxy server according to an embodiment.

In operation 510, the proxy server may receive an access request from a client terminal. When a DNS query domain address is a management target domain address, a DNS blocking server may transmit a fake DNS response packet to the client terminal, and the client terminal may receive the fake DNS response packet and access the proxy server.

In operation 520, the proxy server may identify a destination server from the access request from the client terminal, and receive a requested page from the destination server. For example, the destination server may be a web server. If the destination server is a server of a portal A, the proxy server may identify the server of the portal A, and receive a page of the portal A from the server of the portal A.

In operation 530, the proxy server may log and monitor a request directed to the destination server and communication received from the destination server, and may block the same in accordance with policy. For example, when a request packet from the client terminal is directed to at least one webmail site, the proxy server may notify a predetermined manager, allow outgoing mail transmission through the webmail site when an approval request of the manager is received, and disallow the outgoing mail transmission through the webmail site when the approval request of the manager is absent.

Although the proxy server according to an embodiment does not work, network communication may be performed continuously, and thus Internet communication may be performed smoothly.

The proxy server according to an embodiment may be used by a client terminal although the client terminal does not set the proxy server, and thus an issue of all client terminals needing to set the proxy server may be solved. Further, an issue of a client terminal circumventing network security using another proxy server by changing proxy settings may be solved.

Figure 6B:
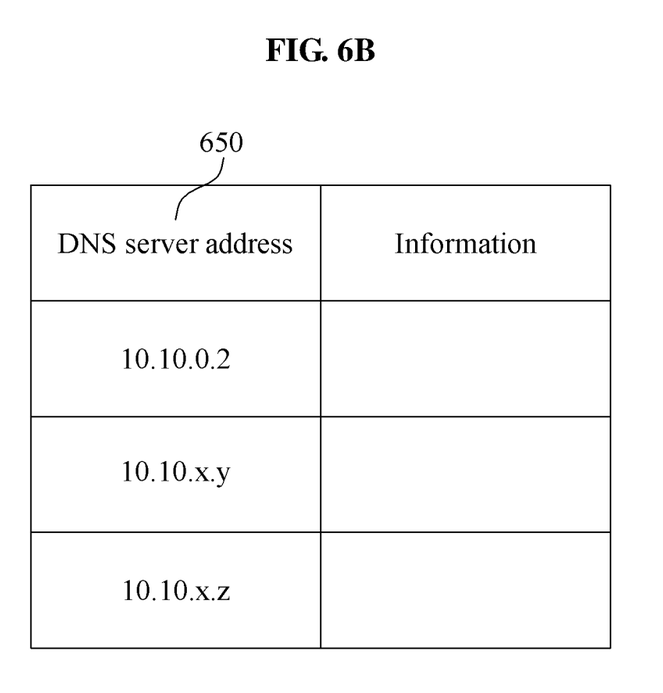

FIGS. 6A and 6B illustrate examples of lists of DNS blocking servers according to an embodiment.

FIG. 6A illustrates an example of storing management target domain addresses.

FIG. 6A illustrates a management target domain address list. The management target domain addresses may be stored in a database of a DNS blocking server, and an external database storing the management target domain addresses may be used. The management target domain address list may include a domain address field 610 and an information field, and may generate and store other fields. In this example, the management target domain address list may be stored in a form of list in the database, and the management target domain addresses may be updated at predetermined intervals. Further, the management target domain address list may correct, add, and delete a domain address.

The management target domain address list may store the management target domain addresses. For example, the management target domain address list may store management target domain addresses such as www.plustech.com, www.abc.com, and www.zzz.com. Further, the management target domain address list may include an address of at last one webmail site.

FIG. 6B illustrates an example of storing blocking target DNS server addresses.

FIG. 6B illustrates a blocking target DNS server address list. The blocking target DNS server addresses may be stored in a database of a DNS blocking server, and an external database storing the blocking target DNS server addresses may be used. The blocking target DNS server address list may include a DNS server address field 650 and an information field, and may generate and store other fields. In this example, the blocking target DNS server address list may be stored in a form of list in the database, and the blocking target DNS server addresses may be updated at predetermined intervals. Further, the blocking target DNS server address list may correct, add, and delete a DNS server address.

The blocking target DNS server address list may store the blocking target DNS server addresses. For example, the blocking target DNS server address list may store blocking target DNS server addresses such as 10.10.0.2, 10.10.x.y, and 10.10.x.z.

The units and/or modules described herein may be implemented using hardware components and software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

The invention claimed is:

1. A network security system comprising;
    a domain name system (DNS) blocking server connected to network equipment to which a client terminal is connected, and configured to mirror a received DNS query packet having a DNS query domain address that is passing through the network equipment from the client terminal, the mirroring creating a mirrored DNS query packet and not preventing the received DNS query packet from being transmitted through said network equipment to the DNS query domain address of the received DNS query packet, the DNS blocking server further configured to generate a fake DNS response packet having a DNS blocking server determined response Internet Protocol (IP) address that is an addressable IP address and transmit the fake DNS response packet to the client terminal in response to the mirrored DNS query packet when the DNS query domain address of the mirrored DNS query packet is a management target domain address; and
    a proxy server having a unique IP address configured to monitor a request packet from the client terminal, the request packet generated using the transmitted fake DNS response packet including the IP address as determined by the DNS blocking server.

2. The network security system of claim 1, wherein the DNS blocking server is configured to generate the fake DNS response packet by inputting the unique IP address of the proxy server as the determined response IP address corresponding to the DNS query domain address of the mirrored DNS query packet.

3. The network security system of claim 1, wherein the DNS blocking server contains a management target domain address list including at least one management target domain address, and
    the DNS blocking server is configured to extract the DNS query domain address from the mirrored DNS query packet, and determine whether the extracted DNS query domain address of the mirrored DNS query packet is the management target domain address based on whether the DNS query domain address is included in the management target domain address list.

4. The network security system of claim 3, wherein the management target domain address list includes an address of at least one webmail site, and
    the proxy server is configured to notify a predetermined manager when the request packet having the IP address as determined by the DNS blocking server and included in the fake DNS response packet is received from the client terminal and is directed to the at least one webmail site, allow outgoing mail transmission through the webmail site when an approval request of the predetermined manager is received, and disallow the outgoing mail transmission through the webmail site when the approval request of the predetermined manager is absent.

5. The network security system of claim 1, wherein the DNS blocking server is configured to extract a DNS server address from the mirrored DNS query packet, and generate and transmit the fake DNS response packet to the client terminal by inputting an IP address of a warning server as the response IP address corresponding to the DNS query domain address of the mirrored DNS query packet when the DNS server address is a blocking target DNS server address.

6. The network security system of claim 5, wherein the warning server is configured to receive the request packet from the client terminal that is responsive to the fake DNS response packet having the warning server IP address and configured to provide responsive thereto the client terminal with a webpage that displays a warning page to warn that the client terminal is using an unauthorized DNS server, along with an IP address of an authorized DNS server.

7. A network security method comprising:
mirroring by a domain name system (DNS) blocking server DNS query packet having a DNS query packet address passing through network equipment to which a client terminal is connected, the mirroring creating a mirrored DNS query packet and not preventing the DNS query packet from passing through the network equipment to the DNS query packet address of the passing DNS query packet;
extracting by the DNS blocking server a DNS query domain address from the mirrored DNS query packet;
determining by the DNS blocking server whether the extracted DNS query domain address from the mirrored DNS query packet is a management target domain address;
generating by the DNS blocking server a fake DNS response packet when the extracted DNS query domain address from the mirrored DNS query packet is the management target domain address, the fake DNS response packet having a DNS blocking server determined response Internet Protocol (IP) address that is an addressable IP address; and
transmitting by the DNS blocking server the generated fake DNS response packet to the client terminal.

8. The network security method of claim 7, wherein the generating comprises generating the fake DNS response packet by inputting an IP address of a proxy server as the determined response IP address corresponding to the mirrored DNS query domain address of the mirrored DNS query packet.

9. A network security method comprising:
mirroring by a domain name system (DNS) blocking server a DNS query packet having a DNS query packet address passing through network equipment to which a client terminal is connected, the mirroring creating a mirrored DNS query packet and not preventing the DNS query packet from passing through the network equipment to the DNS query packet address of the passing DNS query packet;
extracting by the DNS blocking server a DNS server address from the mirrored DNS query packet;
determining by the DNS blocking server whether the extracted DNS server address from the mirrored DNS query packet is a blocking target DNS server address;
generating by the DNS blocking server a fake DNS response packet when the extracted DNS server address from the mirrored DNS query packet is the blocking target DNS server address, the fake DNS response packet having a DNS blocking server determined response Internet Protocol (IP) address that is an addressable IP address; and
transmitting by the DNS blocking server the generated fake DNS response packet to the client terminal.

10. The network security method of claim 9, wherein the generating comprises generating the fake DNS response packet by inputting an IP address of a warning server as the determined response IP address corresponding to a DNS query domain address of the mirrored DNS query packet of the mirrored DNS query packet.

11. The network security method of claim 9, wherein the determining comprises determining whether the extracted DNS server address from the mirrored DNS query packet is the blocking target DNS server address based on whether the DNS server address from the mirrored DNS query packet is included in a preset blocking target DNS server address list.

12. The network security method of claim 7, wherein the determining comprises determining whether the extracted DNS query domain address from the mirrored DNS query packet is the management target domain address based on whether the extracted DNS query domain address from the mirrored DNS query packet is included in a preset management target domain address list.

13. The network security method of claim 11, further comprising:
notifying, by a proxy server, a predetermined manager when a request packet having the IP address as determined by the DNS blocking server and included in the fake DNS response packet is received from the client terminal and the request packet is directed to at least one webmail site, allowing external mail transmission through the webmail site when an approval request of the predetermined manager is received, and disallowing the external mail transmission through the webmail site when the approval request of the predetermined manager is not received.

14. The network security method of claim 9, further comprising:
wherein the generated fake DNS response packet includes as the determined response IP address an IP address of a warning server;
receiving at the warning receiver having the warning receiver IP address of the fake DNS response packet a request packet from the client terminal;
responsive to the receipt of the request packet, providing, by the warning server, the client terminal with a webpage that displays a warning page to warn that the client terminal is using an unauthorized DNS server, along with an IP address of an authorized DNS server when a request packet from the client terminal generated using the received fake DNS response packet is received.

* * * * *